(12) United States Patent
Reynolds et al.

(10) Patent No.: US 6,414,267 B1
(45) Date of Patent: Jul. 2, 2002

(54) METHOD AND APPARATUS FOR CONTROL OF A WELDING POWER SOURCE

(75) Inventors: Jon Reynolds, Appleton; Warren E. Herwig, Oshkosh, both of WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/681,911

(22) Filed: Jun. 25, 2001

(51) Int. Cl.[7] .................................................. B23K 9/10
(52) U.S. Cl. ............................. 219/137 PS; 219/130.1
(58) Field of Search ..................... 219/130.1, 137 PS; 336/133, 134

(56) References Cited

U.S. PATENT DOCUMENTS

| | | | | |
|---|---|---|---|---|
| 2,133,919 A | * | 10/1938 | Fries | 219/130.1 |
| 2,411,370 A | * | 11/1946 | Fries | 336/133 |
| 2,840,789 A | * | 6/1958 | Miller | 336/134 |
| 3,254,318 A | * | 5/1966 | Steinert | 336/133 |
| 3,686,464 A | * | 8/1972 | Hirst | 219/130.1 |
| 3,689,861 A | * | 9/1972 | Gibson | 336/133 |
| 3,697,912 A | * | 10/1972 | Solli | 336/133 |
| 4,107,635 A | | 8/1978 | Brundage et al. | |
| 5,660,749 A | * | 8/1997 | Taguchi et al. | 219/130.1 |
| 6,198,072 B1 | | 3/2001 | Peters | |

* cited by examiner

Primary Examiner—Clifford C. Shaw
(74) Attorney, Agent, or Firm—Timothy J. Ziolkowski; Cook & Franke SC; John H. Pilarski

(57) ABSTRACT

An apparatus and method is disclosed for series inductance-reactance control of a transformer in a welder. The transformer includes a transformer core configured to conduct magnetic flux and at least one primary winding connected to a voltage source that excites the primary windings. Secondary windings, configured to generate secondary voltages and currents for welding, are wound about each of the primary windings and are magnetically coupled to the magnetic flux in the transformer core. The transformer also includes a control core magnetically coupled with a secondary winding, wherein the control core has an inductive reactance in response to the flow of secondary current from the secondary winding. The secondary current is adjustable by varying an air gap between core sections of the control core. A crank mechanism configured to move one of the core sections with respect to the other and vary the distance of the air gap.

32 Claims, 7 Drawing Sheets

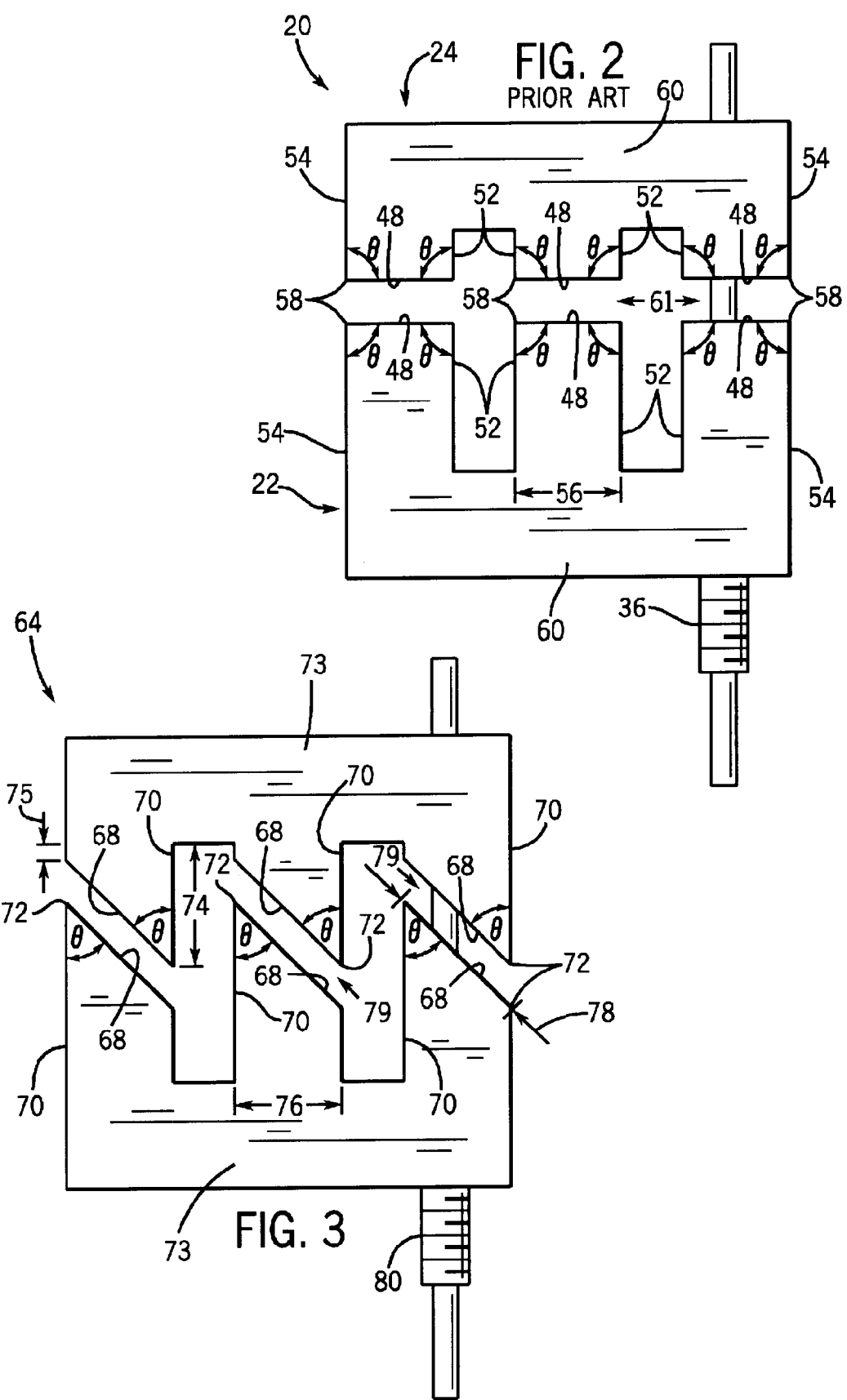

METHOD AND APPARATUS FOR CONTROL OF A WELDING POWER SOURCE

BACKGROUND OF INVENTION

The present invention relates generally to power supplies for welders, and more particularly, to an improved transformer and method to magnetically control a welding power source.

The design and use of relatively constant current arc welders using series inductive reactance as a control element for single-phase and three-phase transformers or generators is known in the art. Generally, such systems are connected to commercially available, single- or three-phase, 50 to 60 Hertz, voltages and currents. For example, in one arc welding system the single- or three-phase output of a gasoline or diesel engine driven generator, which comprises a relatively constant alternating current (AC) terminal voltage, is connected in series to an AC inductor to provide electrical current for AC welding processes. Alternatively, the electrical current can be rectified for direct current (DC) welding processes.

Known three-phase series inductance-reactance control devices include a transformer comprising a transformer core, three primary windings or wire coils, three secondary windings, a divided control core, and a crank mechanism for separating portions of the divided control core. The transformer core is designed to conduct three-phase magnetic flux and has three inner portions that are each encircled by a primary winding. A three-phase voltage source is connected to and excites the primary windings. Three secondary windings surround each of the primary windings and conduct secondary output currents. The divided control core is magnetically coupled to the secondary windings and generally has a first E-shaped laminated portion with three extending members adjacent to three extending members of a second inverted E-shaped laminated portion. The two E-shaped portions have innermost mating surfaces that can be separated or moved towards one another by use of the crank mechanism, which permits an operator to select different weld currents.

The flow of current in the primary coils generates a magnetic flux in the transformer core that induces currents in each of the secondary windings. The, output current values from the secondary windings are a function of the size of the air gap between the extending members of the two E-shaped portions. For example, for smaller air gap lengths where the extending E-shaped members are close together, magnetic flux created by the secondary coils couples more to the E-shaped portions resulting in a higher inductive reactance for the secondary coils and less output current. That is, lower reluctances of the flux paths allow more of the three-phase secondary magnetic flux to be coupled to the control core. This larger amount of coupled secondary magnetic flux field increases the value of the series inductive reactance available for reducing the output voltage. For larger air gaps where at least one of the E-shaped portions are moved away from the other E-shaped portion, less magnetic flux from the secondary coils couples to the E-shaped portions decreasing the series inductive reactance and allowing an increased output current to flow.

Crank mechanisms comprising hand cranks connected to gear systems that can include threaded shafts are commonly used to vary the air gap between the two E-shaped plates due to their inexpensive cost. The hand crank is designed to adjust the air gap between each of the extending members of the two E-shaped plates a fixed amount with each turn of the hand crank using a standard thread shaft and gear arrangement. Problems arise with the use of such devices however due to a non-linear sensitivity of the output current relative to the air gap distance between the two E-shaped portions. The air gap distance increases or decreases a fixed distance for each turn of the hand crank resulting in a change in the total path reluctance of the control core. Since the relationship between the total path reluctance and the length of the air gap is highly non-linear, each turn of the hand crank causes non-linear changes to the secondary output current. This non-linear effect is most noteworthy at small air gaps where the output current is low. Operators however need more control over the output current at the lower end of the current spectrum. One solution may be to change the gear ratio to decrease sensitivity at the low end and provide a wider spectrum. The problem with this mechanical solution is that since the relationship between the air gap distance and the output current is non-linear, decreasing the sensitivity at the low end, creates excessive cranking at the higher end.

It would therefore be desirable to have an economical apparatus and method for decreasing sensitivity of turns of the crank handle to variations in the secondary output current.

SUMMARY OF INVENTION

The present invention provides an apparatus and method of magnetically controlling a welding power source that overcomes the aforementioned concerns.

The present invention includes a series inductance-reactance control apparatus for welding. The transformer includes a transformer core configured to support a magnetic flux and at least one primary winding connected to a single or multi-phase voltage source that excites one or more primary coils, producing a flux in the transformer core. Secondary windings, configured to generate secondary voltages and currents, are wound about each of the primary windings and are magnetically coupled to the magnetic flux in the transformer core. The transformer also includes an improved control core magnetically coupled to the secondary windings. The improved control core has two sections and is configured such that at least one core section is movable by a standard crank mechanism. The transformer and series inductive reactor has an output current that is less sensitive to changes in physical displacements of the core sections when adjusted by the crank mechanism. This enables more accurate output current settings and adjustments by an operator and provides an economical solution for improving adjustment sensitivity.

In accordance with one aspect of the present invention, an apparatus for magnetic control of a welding power source includes a transformer core, at least one primary coil wound around a transformer core, and at least one secondary coil wound around the primary coil. The invention further includes a control core having at least two core sections, each core section having a side edge and a mating edge with an angle other than a right angle formed therebetween, and wherein at least one of the core sections is moveable with respect to another core section.

In accordance with another aspect of the invention, a system for magnetically controlling a welding power source includes a welder having a transformer. The transformer has a transformer core configured to allow flow of magnetic flux. The transformer also includes a primary winding wound about the transformer core having an edge surface defined by the plane formed by the first complete coil turn, and a secondary winding wound about the at least one primary winding and the transformer core. The transformer further includes a control core having a pair of core sections configured to move with respect to one another and each having a mating surface. At least one of the mating surfaces is other than parallel to the plane of the edge surface.

In accordance with yet another aspect of the present invention, a method for controlling magnetic flux of a welding power source includes providing a transformer core configured to allow flow of magnetic flux, providing a voltage across at least one primary winding encircling the transformer core, and magnetically coupling at least one secondary winding to the transformer core. The method further includes the step of varying a gap width between mating surfaces of two core sections, each core section having a base and at least one extending member that is non-rectangularly-shaped. The two control core sections are magnetically coupled to the at least one secondary winding.

The present invention also includes an apparatus for magnetic control of a welder power source having a means for creating and allowing flow of magnetic flux, and a means for generating a secondary current from the magnetic flux. The apparatus further includes a means for adjusting the secondary current, and a means for decreasing sensitivity of the adjusting means to variations in the secondary current at a lower end of a current output spectrum.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 2 is a top planar view of the first threaded shaft of a prior art control core for the apparatus of FIG. 1.

FIG. 3 is a top planar view of a control core in accordance with the present invention.

DETAILED DESCRIPTION

Figure 1:
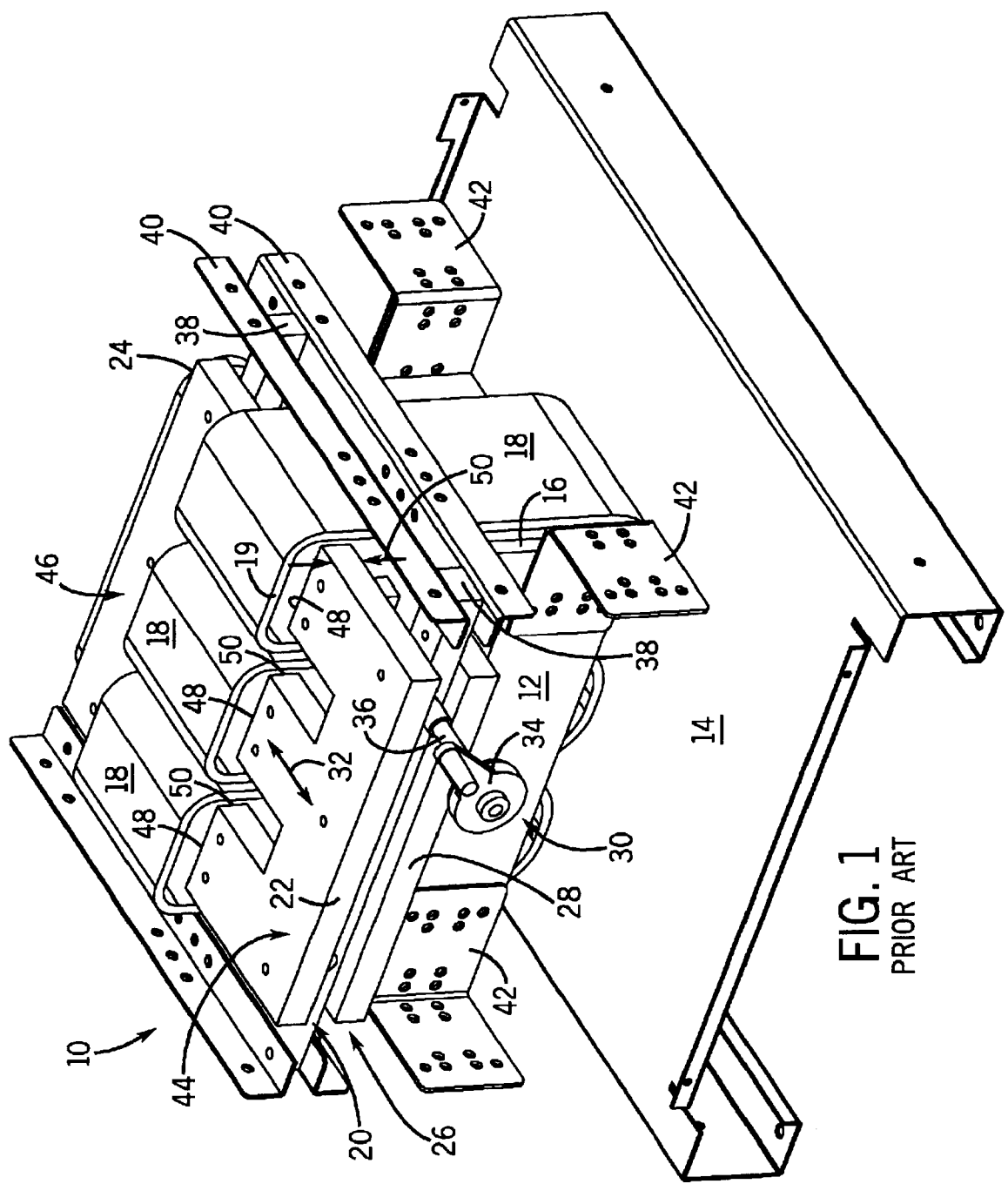
FIG. 1 is a prospective view of a prior art three-phase series inductance-reactance control apparatus for a welder.

Referring to FIG. 1, an exemplary three-phase series inductance-reactance control apparatus 10 for welding is shown which includes a transformer core 12 connected to a power source base 14. The apparatus 10 also includes three primary windings or coils 16 which are connected to a three-phase voltage source (not shown). The primary windings 16 are wound about the transformer core 12, which conducts magnetic flux when the primary windings 16 are energized by a voltage source. Secondary windings 18 are wound about the primary windings 16 and are magnetically coupled to the transformer core 12. An edge surface 19 of the secondary windings 18 defines a plane which will later be used to define orientation of other components. The generation of magnetic flux from the primary coils 16 causes the secondary windings 18 to generate secondary three-phase voltages and currents for use during welding processes.

The apparatus 10 further includes a control core 20 having a movable core section 22 coplanar with a stationary core section 24. A second control core 26 is aligned parallel with control core 20 and includes a second movable core section 28. A control or crank mechanism 30 includes a crank handle 34 and gear assembly (not shown) that can be operated or turned to move the movable core sections 22, 28 in the direction of arrows 32. The crank mechanism 30 includes handle 34, a first threaded shaft 36 and such internal components as a pair of sprockets, a chain, and a second threaded shaft. Each of the core sections 22, 28 of the control cores 20, 26 are structurally stabilized and guided by support bars 38 and tracks 40. Brackets 42 also provide support for the apparatus 10.

The moveable core section 22 has an upper surface area 44 and is commonly formed from a metal material having a higher permeability than air, such a series of iron or steel laminated plates. The stationary core section 24 can be similarly formed from a metal material, and has an upper surface area 46. Since metal materials are more permeable than air, the magnetic flux generated by the primary coils 16 is concentrated in the metal core sections 22, 24 as opposed to being diverted in air. This permeability characteristic permits control of the output current by movement of the moveable core section 22 into or out of the secondary coils 18 in the direction of arrows 32. As the moveable core sections 22, 28 are removed from the secondary coils 18, the output current is increased since the reluctance increases for the magnetic flux that passes through each of the mating surfaces or edges 48 having a height 50.

Referring now to FIG. 2, the movable and stationary core sections 22, 24 and the first threaded shaft 36 are shown. The core sections 22, 24 are E-shaped and are defined by inner side surfaces or edges 52, outer side surfaces or edges 54, and mating edges 48 having a width 56. Adjacent mating surfaces 48 and inner side surfaces 52 of each of the core sections 22, 24 define three rectangular extending members 58 linked together by a base 60. A surface area bounded by an inner side edge 52 and a mating edge 48 of one of the control cores sections 20, 24, but preferably the moveable core section 22, is greater than the other core section. That is, one set of the rectangular extending members 58 extends further than those of the other core section. Since the core sections 22, 24 are formed of magnetic materials, the magnetic flux generated prefers to travel through the base 60 and the rectangular extending members 58. The mating surfaces 48 of each of the core sections 22, 24 are separated by an air gap 61. The E-shape of the core sections 22, 24 is further characterized by an angle θ, which defines right angles between the mating surfaces 48 and the inner and outer side surfaces 52, 54 of the core sections 22, 24.

FIG. 3 shows one embodiment of a pair of core sections 64 having an angle θ that is other than a right angle. The angle θ is located between extended mating surfaces 68 and side surfaces 70, and can have values other than 0° and 90°, but is preferably 45°. Each of the pair of core sections 64 has three non-rectangular extending members 72 commonly connected to a base 73. Since both of the pair of core sections 64 are comprised of materials having a higher permeability than air, such as iron or steel plates, the magnetic flux prefers to travel through the base 73 and non-rectangular extending members 72. Each of the non-rectangular extending members 72 has a side length 74 greater than a side surface 75 parallel to the moveable direction 32 of the pair of core sections 64. In one embodiment, the bases 73 and non-rectangular extending members 72 of each separate pair of core sections 64 are preferably coplanar. In other embodiments, the extended mating surfaces 68 can be parallel to one another and prevented from contacting each other, or one of the pair of core sections 64 can be moveable while the other is stationary.

There are two distinct advantages to using an angle θ that is other than a right angle, both of which combine to provide improved control of the secondary output current. First, if a width 76 of an extended mating surface 68 is equal to the width 56 of a mating surface 48 of a rectangular extending member 58, then the extended mating surface 68 has a length 78 that is greater by the factor $(\sin θ)^{-1}$ than the length 56 of an E-shaped mating surface 48. Second, each turn of the crank handle 34 causes a change in an air gap 79 that is less by a factor of $\sin θ$ than the air gap 61 of the E-shaped core sections 22, 24. An advantage of a longer extended mating surface 68 is that the reluctance decreases as the cross-sectional area of the air gap 79 increases. Since the cross-sectional area of the air gap 79 is equal to the cross-sectional area of the extended mating surfaces 68, the reluctance decreases for angles θ that are other than a right angle if the pair of core sections 64 has the equivalent core section height 50 as E-shaped core sections 22, 24. The reluctance also increases as flux path length in the air gap 79 increases. Since each crank turn of the crank handle 34 causes a lesser increase in the air gap 79 as compared to the E-shaped core sections 22, 24, there is less increase in the reluctance for each turn of the crank handle 34 and threaded shaft 80. The following example illustrates the above relationships further. Assuming each of the non-rectangular extended members 72 have angles θ=30° and widths=W, then each of the extended mating surfaces 68 have lengths=L equal to 2 W or twice the width since sin 30°=0.5, and L=W/sin θ. Additionally, if the air gap 61 of the E-shaped core sections 22, 24 is increased by a distance=X for one crank turn, then the increased air gap 79 between the non-rectangular extending members 72 is equal to X multiplied by the sin 30° which is equal to 0.5 X.

Figure 4:
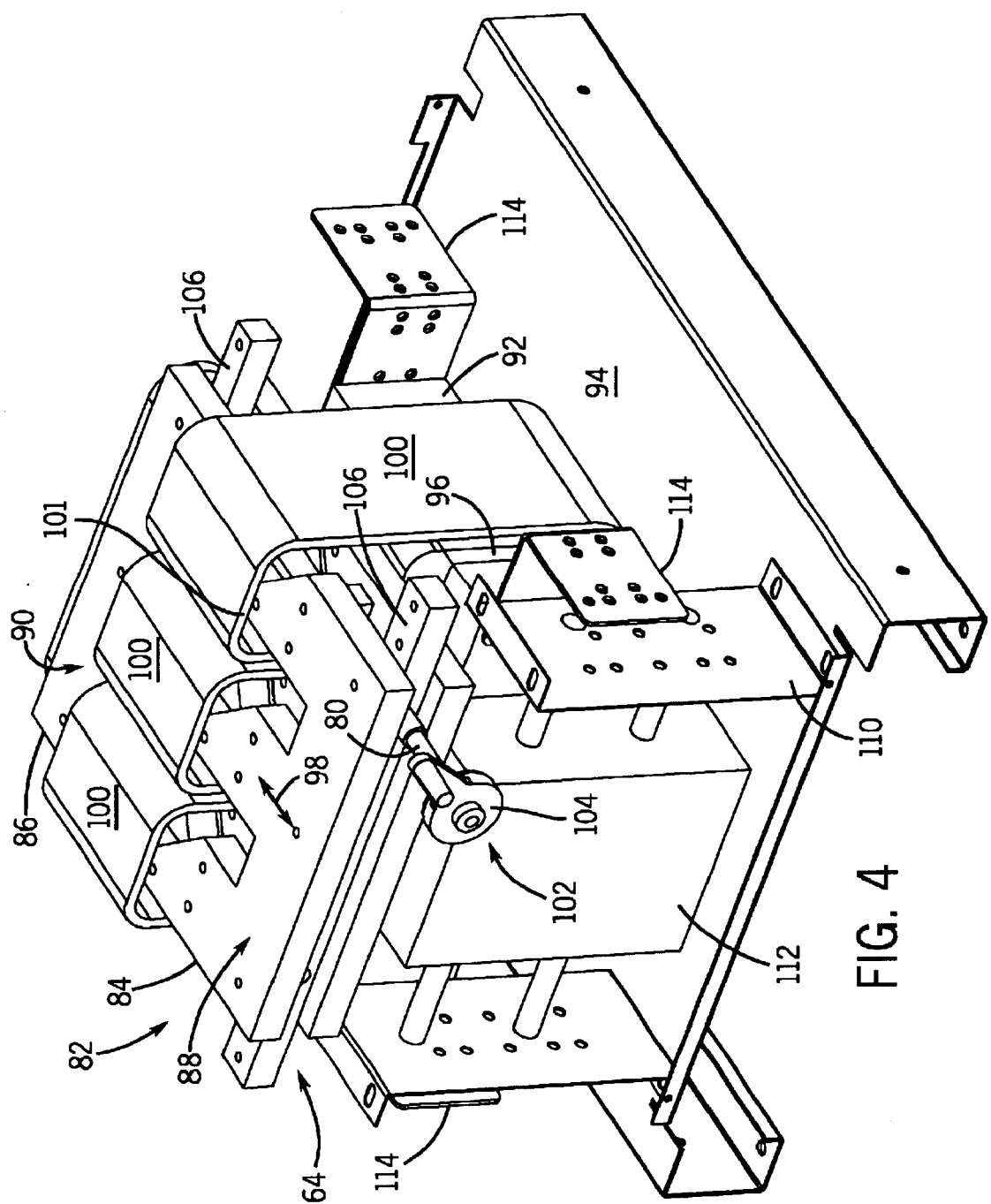
FIG. 4 is a perspective view of a three-phase series inductance-reactance control apparatus for a welder implementing the control core of FIG. 3.

Referring now to FIG. 4, an apparatus for magnetic control for a welding power source or transformer 82 is shown having two pairs of control core sections 64. Each of the pairs of control core sections 64 has a movable core section 84 and a stationary core section 86. An upper surface 88 of the movable core section 84 preferably has an area greater than an upper surface 90 of the stationary core section 86. A transformer core 92 is configured to allow flow of three-phase magnetic flux and is mounted to power source base 94. Each of the primary windings 96 are made up of a plurality of coil windings (not shown) that encircles the three-phase transformer core 92. The moveable core sections 84 are configured to move in the direction of movable direction arrows 98. Three secondary windings 100 are each wound around a respective primary winding 96 and are magnetically coupled to the transformer core and the pair of control core sections 64. For the three-phase apparatus 82, the primary and secondary windings 96, 100 can be connected in any combination of delta-wye transformations as is known to one skilled in the art. The secondary windings 100 have an edge surface 101 defining a plane that is other than parallel to at least one of the mating surfaces 68 shown in FIG. 3.

The apparatus 82 includes a crank mechanism 102 having a handle 104, the threaded shaft 80, and inner components (not shown) such as sprockets, a chain, and a second threaded shaft for translating motion from the crank handle 104 to movement of the movable core section 84. Depending on whether the handle 104 is turned in a clockwise or counter-clockwise direction, the movable core section 84 is moved in the movable direction 98 a fixed distance for each turn. Two support bars 106 provide support for the core sections 84, 86 and guide the movable core section 84 in the movable direction 98. Bridge rectifier mounting brackets 110 are connected to the power source base 94 and a three-phase bridge rectifier 112. The three-phase bridge rectifier 112 rectifies the secondary current when a DC weld output is implemented. Brackets 114 provide structural support for the transformer core 92.

Figure 5:
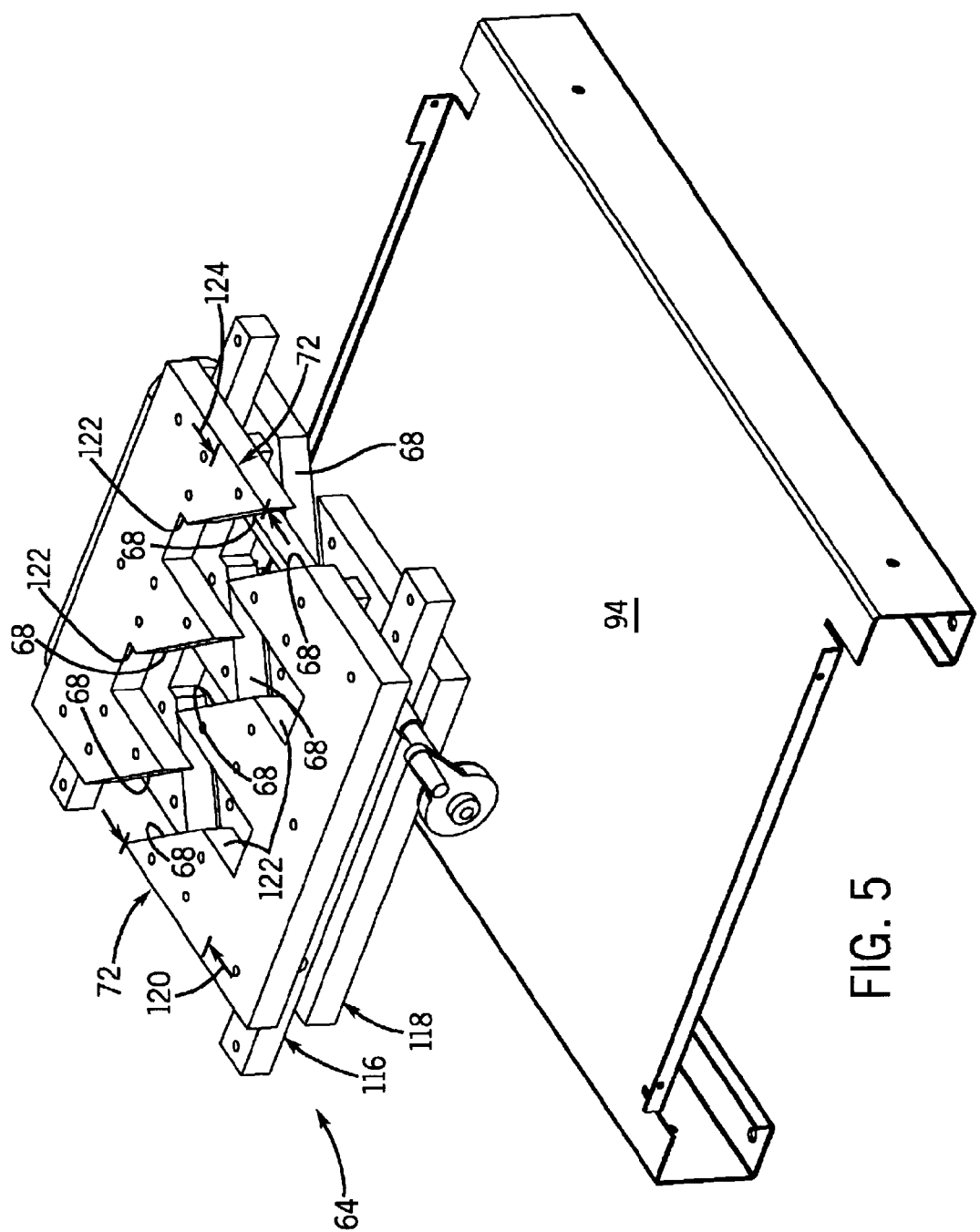
FIG. 5 is a perspective view of a portion of the apparatus of FIG. 4 showing the orientation of the mating surfaces of the control cores.

FIG. 5 is a perspective view of a portion of the apparatus 82 of FIG. 4 showing the positioning of the extended mating surfaces 68 of the two pairs of core sections 64. The mating surfaces 68 of a first control core 116 having a pair of core sections 64 are parallel to one another. Similarly, mating surfaces 68 of a second control core 118 are also parallel to one another. It is preferable to rotate one of the control cores with respect to the other by 180° to minimize physical effects of noise and vibrations of the control cores 116, 118. Similar to the prior art E-shaped rectangular extending members 58, one of the pair of core sections 64 for each of the control cores 116, 118 has a length 120 which defines a surface area bounded by an inner side edge 122 and a mating surface 68 which is greater than a surface area of the other core section having a length 124 and bounded by inner side edge 122 and mating surface 68.

Figure 6:
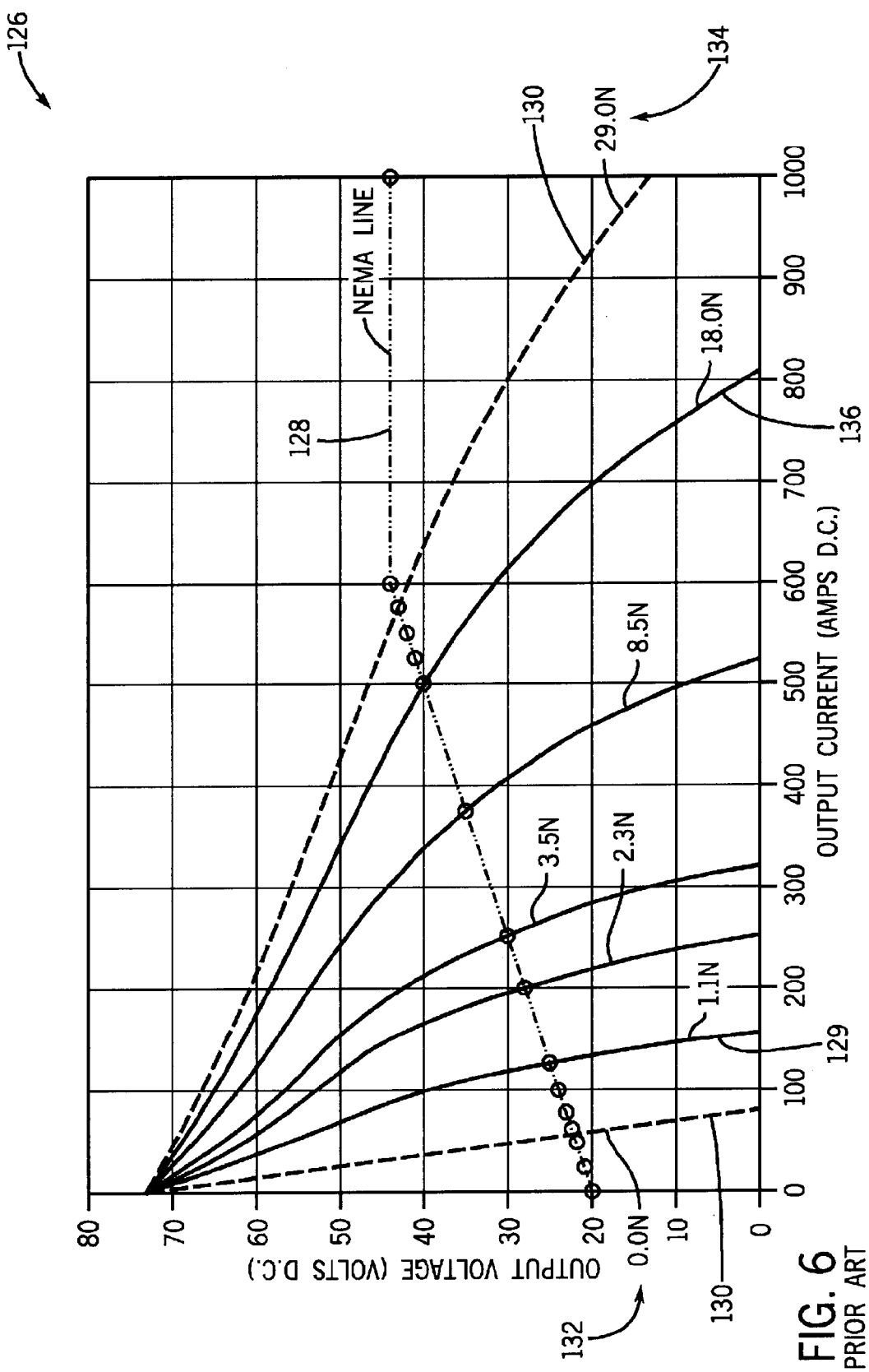
FIG. 6 is a performance graph for the prior art apparatus of FIG. 1 having a control core such as that shown in FIG. 2.

FIG. 6 is a performance graph 126 of the 3-phase series inductance-reactance control apparatus 10 of FIG. 1. For a particular weld current dial setting on a welder, the welder operates along what is generally referred to as the NEMA Class 1 line 128. The NEMA line 128 is specified by a standard established by the National Electrical Manufacturer's Association. For threaded shaft 36 having 11 threads/inch National Pipe Thread, the 125 Amp NEMA weld curve 129 is selected by repositioning the moveable core sections 22, 28 by 1.1 crank turns. The performance graph 126 also includes data of output voltage versus output current shown as dashed lines 130 for the minimum and maximum air gap 61 between the moveable core section 22 and stationery core section 24. The air gap length 61 is defined in terms of a number of hand crank turns 132 with 0.0 N defining a zero air gap length 61 and 29.0N 134 defining an air gap length 61 between the moveable core section 22 and the stationery core section 24 after 29 crank handle turns. Solid lines 136 show actual measured NEMA CLASS 1 data for different crank handle turn positions. Each of the dashed lines 130 and solid lines 136 show drooping voltage versus current curves that approximate a constant current over a limited operating range.

Figure 7:
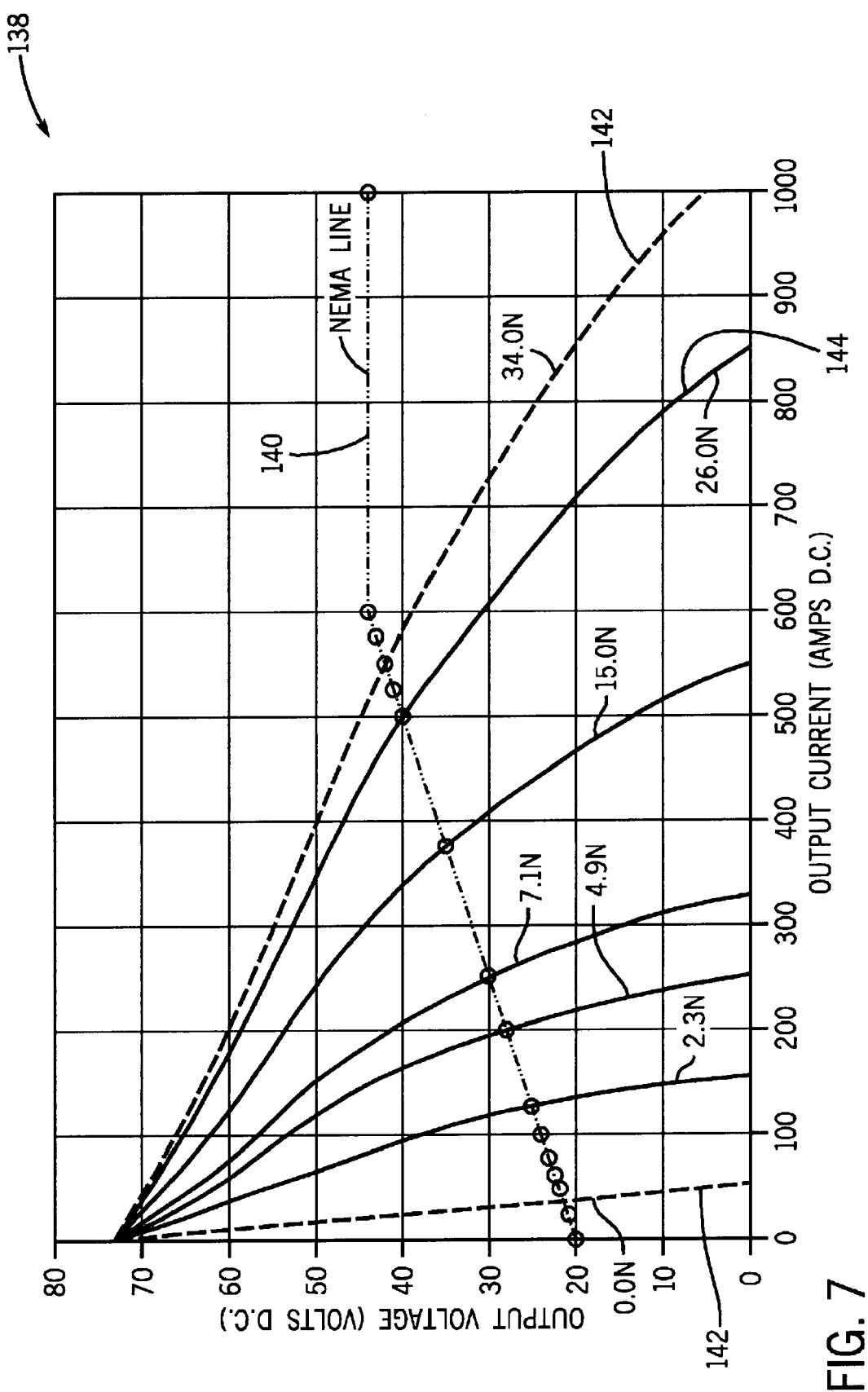
FIG. 7 is a performance graph for the apparatus of FIG. 4 having a control core such as that shown in FIG. 3 in accordance with the present invention.

FIG. 7 is a performance graph 138 for the apparatus 82 of FIG. 4. NEMA Class 1 line 140 shows the operating voltages and currents of a welder using the control apparatus 82 of FIG. 4 for a specified weld current. Dashed lines 142 provide data for minimum and maximum air gap 79 between the moveable core section 84 and stationery core section 86 which is defined in terms of the number of turns of a crank handle. Solid lines 144 provide measured values of output voltage versus output current for the apparatus 82 and show the decreased sensitivity of crank handle turns to variations in the output or secondary current. For example, at the lower end of the current output spectrum, the number of turns required is approximately double for the same current output thereby greatly increasing sensitivity where it is needed the most.

Figure 8:
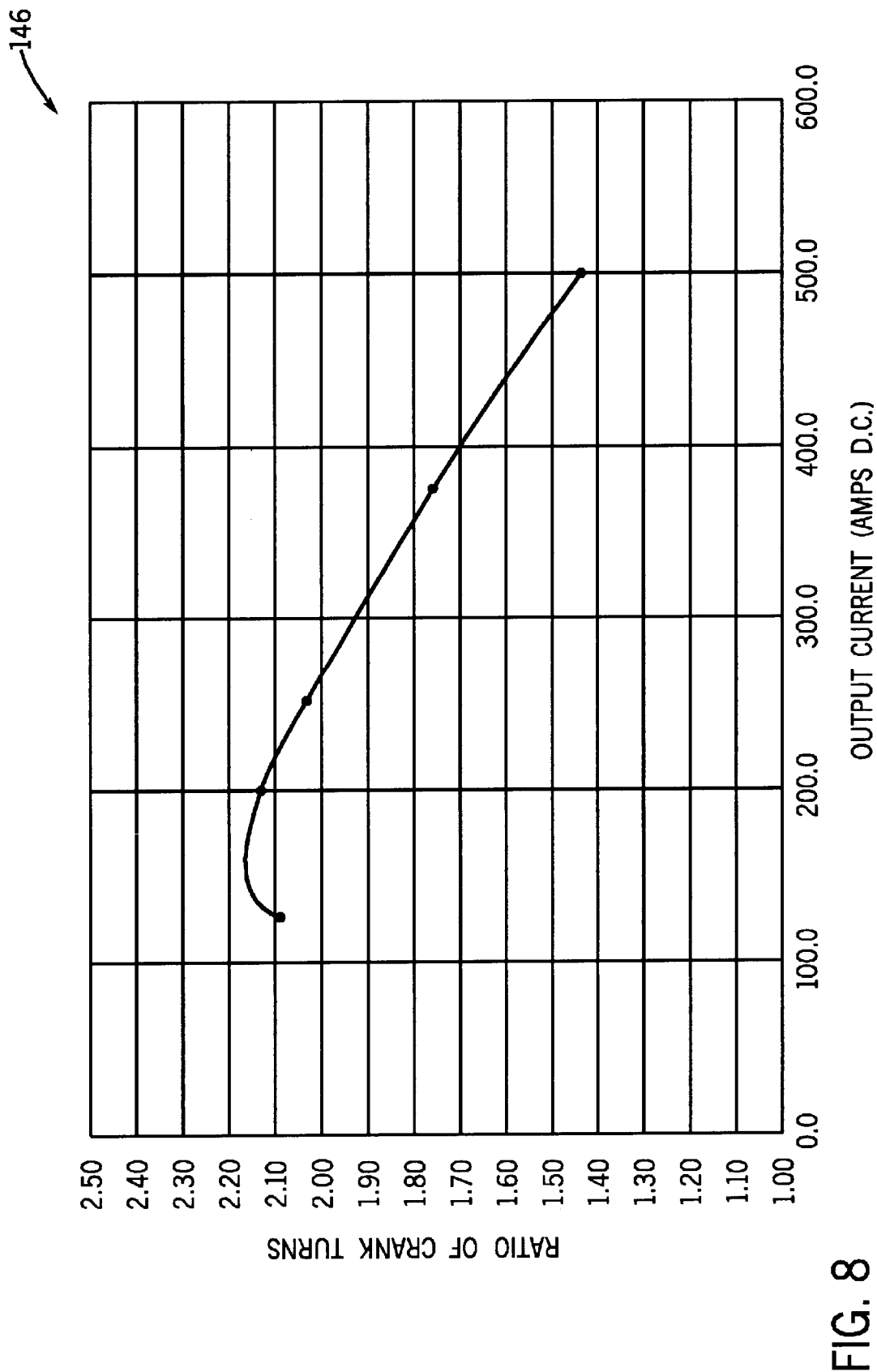
FIG. 8 is a graph comparing a ratio of crank turns between a prior art apparatus and the apparatus of FIG. 4 versus output current.

Referring now to FIG. 8, a sensitivity graph 146 is shown comparing the ratio of the number of crank turns for an apparatus 82 of FIG. 4 divided by the number of crank turns for the prior art apparatus 10 of FIG. 1 versus the output current. For output currents below a lower end of a current output spectrum comprising output currents less than 300 amps, the ratio of crank turns is about 2.00. The ratio gradually decreases towards 1.40 for higher output currents. Having a 2 to 1 ratio for low output currents gives an operator using the apparatus 82 of FIG. 4 improved control of the output current during welding since twice as many turns of the crank handle are required as compared to the prior art apparatus 10. Improved control in the low output current range is desirable since most welding occurs in the 60 to 250 amp range.

Although an apparatus for magnetic control of a welding power source 82 has been disclosed, other alternative embodiments are within the scope of this invention. In one embodiment, the transformer can be configured to support single-phase voltage sources and currents. Other multi-phase transformer configurations are also contemplated, such as a separate apparatus that is a three-phase series variable inductance control. In another alternative embodiment, the control core may comprise a single control core or multiple control cores, wherein one or more of the control cores comprise a series of planar laminated plates. Additionally, for embodiments with more than one control core, each of the additional control cores can be rotated at angles other than 180°, or aligned in parallel with the first control core.

Other embodiments for the pair of core sections are also possible. The angle θ between an extended mating surface and a side surface can be varied over a wide range of values between, but not including, 0° and 90° for any number of the non-rectangular extending members. Additionally, the apparatus can be configured to have one or both of the pair of core sections moveable with respect to the other core section. Furthermore, the extended mating surfaces can be planar, curved, or any other type of curvilinear shape, as long as the cross-sectional area of the air gap is increased.

In accordance with one aspect of the present invention, an apparatus for magnetic control of a welding power source includes a transformer core configured to conduct single or multi-phase magnetic flux, at least one primary coil encircling a transformer core, and at least one secondary coil wound about the primary coil. The invention further includes a control core having at least two core sections, wherein each of the core sections has a permeability greater than air. Each of the core sections has a side edge and a mating edge with an angle other than a right angle formed therebetween, and has at least one of the core sections moveable with respect to another core section.

In accordance with another aspect of the invention, a system for magnetically controlling a welding power source comprises a welder having a transformer, the transformer further comprising a transformer core, such as a three-phase core, is configured to allow flow of magnetic flux. The transformer also includes a primary winding encircling the transformer core and having an edge surface defining a plane. A secondary winding encircles the at least one primary winding and the transformer core, and is magnetically connected to the transformer core and primary winding. The transformer further includes a control core having a pair of core sections configured to move with respect to one another and each having a mating surface, wherein at least one mating surface is other than parallel to the plane of the edge surface.

In accordance with yet another aspect of the present invention, a method for controlling single or poly-phase magnetic flux of a welding power source includes providing a transformer core configured to allow flow of the magnetic flux, providing a single or poly-phase voltage across at least one primary winding wound around the transformer core, and magnetically coupling at least one secondary winding to the transformer core. The method further comprises the step of varying a gap width between extended mating surfaces of two core sections, each core section having a base and at least one extending member that is non-rectangular, and wherein the two control core sections are magnetically coupled to the at least one secondary winding.

Accordingly, the present invention also includes an apparatus for magnetic control of a welder power source comprising a means for creating and allowing flow of a single or poly-phase magnetic flux, and a means for generating a secondary current from the created and conducted magnetic flux. The apparatus further includes a means for adjusting the secondary output current, and a means for decreasing sensitivity of adjusting means to variations in the secondary output current at a lower end of a current output spectrum.

The present invention has been described in terms of the preferred embodiment, and it is recognized that equivalents, alternatives, and modifications, aside from those expressly stated, are possible and within the scope of the appending claims.

What is claimed is:

1. An apparatus for magnetic control of a welding power source comprising:
   a transformer core;
   at least one primary coil wound about the transformer core;
   at least one secondary coil wound about the primary coil; and
   first and second control cores rotated with respect to one another, each control core having at least two core sections, each core section having a side edge and a mating edge with an angle other than a right angle formed therebetween, and wherein at least one of the core sections is moveable with respect to another core section and the mating edge of the first control core is not aligned with the mating edge of the second control core.

2. The apparatus of claim 1 wherein the apparatus is a three-phase series variable inductance control.

3. The apparatus of claim 1 further comprising a control mechanism for moving at least one of the core sections with respect to another core section.

4. The apparatus of claim 1 wherein two of the core sections are coplanar.

5. The apparatus of claim 1 wherein an area of a surface area bounded by an inner side edge and a mating edge of one of the core sections is greater than at least one other core section.

6. The apparatus of claim 1 wherein the each core section comprises a series of planar laminated plates.

7. The apparatus of claim 1 wherein the core sections are identical and each has an angle equal to 45° between one of a mating edge and a side edge of one of the pair of control cores.

8. The apparatus of claim 1 wherein the first and second control cores are rotated 180° with respect to one another.

9. A system for magnetically controlling a welding power source comprising:
- a welder having a transformer, the transformer further comprising:
- a transformer core configured to allow flow of magnetic flux;
- a primary winding wound about the transformer core having an edge surface defining a plane;
- a secondary winding wound about the at least one primary winding and the transformer core; and
- a pair of control cores oppositely orientated, each control core having a pair of core sections configured to move with respect to one another and each having a mating surface, wherein at least one mating surface is other than parallel to the plane of the edge surface of the primary winding.

10. The system of claim 9 wherein the mating surfaces of the core sections are parallel to one another and each of the mating surfaces has an adjacent side surface with angle θ equal to 45° therebetween.

11. The system of claim 9 further comprising a crank mechanism configured to reposition the mating surfaces with respect to one another.

12. The system of claim 9 wherein the pair of core sections of the control core further comprise a moveable core section and a stationary core section, and wherein an area of a surface area bounded by an inner side edge and the mating surface of the moveable core section is greater than the stationary core section.

13. The system of claim 9 wherein the control core is a three-phase series inductance control core.

14. The system of claim 9 wherein the pair of core sections are coplanar.

15. The system of claim 9 wherein the secondary winding is magnetically coupled to the transformer core and the pair of control cores.

16. A method for controlling magnetic flux of a welding power source comprising:
- providing a transformer core configured to allow flow of magnetic flux;
- providing a voltage across at least one primary winding encircling the transformer core;
- magnetically coupling at least one secondary winding to the transformer core; and
- varying a gap width between mating surfaces of four core sections, each core section having a base and at least one extending member that is non-rectangular, and wherein two core sections are rotated with respect to the other two core sections.

17. The method of claim 16 wherein the gap width is increased in a moveable direction and wherein each of the mating surfaces of the four core sections are other than perpendicular to the moveable direction.

18. The method of claim 17 wherein the mating surfaces of the four core sections are parallel to one another.

19. The method of claim 17 wherein the each of the extending members has a side length in the moveable direction greater than a side surface parallel to the moveable direction.

20. The method of claim 16 wherein increasing the gap width between the mating surfaces of the four core sections decreases the magnetic coupling of the four core sections to the at least one secondary winding.

21. The method of claim 16 wherein the four core sections comprise a series of laminated plates.

22. The method of claim 16 wherein the welding power source is configured to conduct three-phase magnetic flux with variable reluctance.

23. The method of claim 16 further including the step of preventing the two core sections from contacting each other.

24. An apparatus for magnetic control of a welder power source comprising:
- means for creating and allowing flow of magnetic flux;
- means for generating a secondary current from the magnetic flux;
- means for adjusting the secondary current;
- means for decreasing sensitivity of the adjusting means to variations in the secondary current at a lower end of a current output spectrum; and
- means for controlling a magnitude of the magnetic flux comprising a pair of control cores rotated with respect to one another, each control core having two core sections, each core section having a side edge and a mating edge and where at least one of the core sections is moveable with respect to another core section, and where an angle formed between the mating edge and at least one side edge is an angle other than a right angle.

25. The apparatus of claim 24 wherein the means for creating and allowing flow of magnetic flux is a transformer connected to a voltage source.

26. The apparatus of claim 24 wherein the transformer is configured to support a three-phase magnetic flux.

27. The apparatus of claim 24 wherein the means for generating a secondary current comprises at least one secondary winding magnetically coupled to a transformer core.

28. The apparatus of claim 24 wherein the means for adjusting the secondary current is a crank mechanism configured to move at least one of the core sections in a movable direction.

29. The apparatus of claim 28 wherein the means for decreasing the sensitivity of the crank mechanism comprises having the angle formed between the mating edge and the side edge of each core section other than a right angle.

30. The apparatus of claim 24 wherein each of the control cores comprises a plurality of laminated plates.

31. The apparatus of claim 24 wherein the means for adjusting the secondary current is a crank mechanism configured to increase the air gap between the mating surfaces of each of the core sections.

32. The apparatus of claim 24 wherein the lower end of a current output spectrum comprises output currents less than 300 amps.

* * * * *